United States Patent
Hosseiny et al.

(10) Patent No.: US 11,313,044 B2
(45) Date of Patent: Apr. 26, 2022

(54) ELECTROLYZER AND METHOD FOR SPLITTING WATER

(71) Applicant: Deutsches Zentrum fuer Luft- und Raumfahrt e.V., Cologne (DE)

(72) Inventors: Seyed Schwan Hosseiny, Molbergen (DE); Jens Mitzel, Gerlingen (DE); Aldo Saul Gago Rodriguez, Stuttgart (DE)

(73) Assignee: Deutsches Zentrum fuer Loft- und Raumfahrt e.V., Cologne (DE)

( * ) Notice: Subject to any disclaimer, the term of this patent is extended or adjusted under 35 U.S.C. 154(b) by 4 days.

(21) Appl. No.: 16/947,737

(22) Filed: Aug. 14, 2020

(65) Prior Publication Data

US 2021/0054511 A1 Feb. 25, 2021

(30) Foreign Application Priority Data

Aug. 20, 2019 (DE) .................. 10 2019 122 356.3
Oct. 28, 2019 (DE) .................. 10 2019 129 071.6

(51) Int. Cl.
*C25B 1/04* (2021.01)
*C25B 15/02* (2021.01)
(Continued)

(52) U.S. Cl.
CPC .............. *C25B 1/04* (2013.01); *C25B 9/23* (2021.01); *C25B 9/73* (2021.01); *C25B 11/02* (2013.01); *C25B 11/044* (2021.01); *C25B 15/02* (2013.01)

(58) Field of Classification Search
CPC .............. C25B 1/04; C25B 9/19; C25B 15/02
(Continued)

(56) References Cited

U.S. PATENT DOCUMENTS 10,604,852 B2 * 3/2020 Cronin .................. C25B 1/55
11,043,686 B2 * 6/2021 Wang ................ H01M 8/04276
(Continued)

FOREIGN PATENT DOCUMENTS

WO  2014035919  3/2014

OTHER PUBLICATIONS

Mckone, et al; "Earth-abundant hydrogen evolution electrocatalysts"; The Royal Society of Chemistry, Chemical Science; Nov. 5, 2013; pp. 865-878.

*Primary Examiner* — Brian W Cohen
(74) *Attorney, Agent, or Firm* — Lipsitz & McAllister, LLC (57) ABSTRACT

An electrolyzer for splitting molecular water into molecular hydrogen and molecular oxygen using electrical energy comprises an anodic half-cell with an anode and a cathodic half-cell with a cathode. The anodic half-cell and the cathodic half-cell are separated from each other by a separator. The anodic half-cell comprises an anodic electrolyte, which is in contact with the anode. The cathodic half-cell comprises a cathodic electrolyte, which is in contact with the cathode. The anodic half-cell comprises an anodic catalyst. The cathodic half-cell contains at least one cation complex for forming at least one mediator complex. The at least one cation complex is reducible to the mediator complex by taking up at least one electron at the cathode. The mediator complex is a catalytically active chemical complex for splitting the molecular water ($H_2O$) into molecular hydrogen ($H_2$) and hydroxide ions ($OH^-$) while releasing at least one electron.

20 Claims, 6 Drawing Sheets

(51) Int. Cl.
*C25B 11/02* (2021.01)
*C25B 9/73* (2021.01)
*C25B 9/23* (2021.01)
*C25B 11/044* (2021.01)

(58) Field of Classification Search
USPC .......................................................... 423/657
See application file for complete search history.

(56) References Cited

U.S. PATENT DOCUMENTS

| | | | |
|---|---|---|---|
| 11,050,076 B1* | 6/2021 | Wang | C25B 9/19 |
| 2015/0017494 A1* | 1/2015 | Amstutz | H01M 4/8615 429/70 |
| 2017/0297913 A1* | 10/2017 | Cronin | C25B 9/73 |
| 2018/0265995 A1 | 9/2018 | Motoshige et al. | |
| 2020/0270755 A1* | 8/2020 | Modestino | C25B 1/04 |

* cited by examiner

$$V^{3+} + \text{complexing agent} \rightarrow V^{3+}(\text{complex}) \quad (1)$$

$$V^{3+}(\text{complex}) + e^- \rightarrow V^{2+}(\text{complex}) \quad (2)$$

$$4\,V^{2+}(\text{complex}) + 2\,H_2O \rightarrow 4\,V^{3+}(\text{complex}) + 2\,H_2 + 4\,OH^- \quad (3)$$

$$4\,OH^- \xrightarrow{Ni} O_2 + 2\,H_2O + 4\,e^- \quad (4)$$

ELECTROLYZER AND METHOD FOR SPLITTING WATER

CROSS-REFERENCE TO RELATED APPLICATIONS

This application claims the benefit of German applications number 10 2019 122 356.3 filed on Aug. 20, 2019 and number 10 2019 129 071.6 filed on Oct. 28, 2019, which are incorporated herein by reference in their entirety and for all purposes.

FIELD OF THE INVENTION

The present invention relates to electrolyzers in general, and specifically an electrolyzer for splitting molecular water into molecular hydrogen and molecular oxygen using electrical energy, which electrolyzer comprises an anodic half-cell with an anode and a cathodic half-cell with a cathode, wherein the anodic half-cell and the cathodic half-cell are separated from each other by a separator, wherein the anodic half-cell comprises an anodic electrolyte, which is in contact with the anode, and wherein the cathodic half-cell comprises a cathodic electrolyte, which is in contact with the cathode, wherein the anodic half-cell comprises an anodic catalyst.

The present invention further relates to methods for splitting molecular water into molecular hydrogen and molecular oxygen in general, and specifically a method for splitting molecular water into molecular hydrogen and molecular oxygen using electrical energy, in which method hydroxide ions are oxidized in an anodic half-cell with an anode with the involvement of an anodic catalyst, wherein the anodic half-cell is separated from a cathodic half-cell with a cathode by a separator, wherein the anodic half-cell comprises an anodic electrolyte, which is in contact with the anode, and wherein the cathodic half-cell comprises a cathodic electrolyte, which is in contact with the cathode.

BACKGROUND OF THE INVENTION

Hydrogen as an energy carrier of the future has the advantage over fossil fuels that only water and no carbon dioxide is created as a reaction product in the combustion thereof.

It is known to use electrolyzers to produce hydrogen. In electrolysis, water molecules are split into molecular hydrogen and molecular oxygen. In particular electrical energy that is generated from renewable or regenerative energies may be used here as an energy carrier. The production of carbon dioxide can thereby be completely avoided.

Known electrolyzers also have disadvantages, however. They either are inefficient or very expensive or have a complex structure. This is due, for one, to the fact that noble metal catalysts have to be used in acidic electrolytes in order to split the water.

A further problem is the electrolytes that are used. In currently known commercial systems, the electrolytes must either be highly alkaline or consist of highly pure water. Alkaline electrolytes with a high pH value are achieved by adding potassium hydroxide to water. Producing potassium hydroxide is an energy-intensive process, however. In addition, potassium hydroxide is highly corrosive. Moreover, in electrolysis in an alkaline milieu, hydroxide ions are consumed, such that alkaline electrolyte has to constantly be added. Pure water does prevent the poisoning of the catalysts, but has only a very low conductivity.

A currently developing field is anion membrane electrolysis. Work is being done intensively on the power efficiency, the membrane, the stability of the catalysts, the simple handling and in particular the reduction in costs of the electrolysis cells.

One problem with anion exchange membrane electrolysis is the water splitting itself. The water splitting is thereby achieved by applying a theoretical potential of 1.23 V. This potential is the difference of the potential of the hydrogen evolution, which is −0.828 V, and the oxygen evolution at the anode, the potential of which is 0.401 V. Because these are theoretical values, however, and the catalyst specifies the actual required potential at which the reactions at the anode and the cathode can take place, the actual required cell potential is much higher.

Cell potentials of anion exchange membrane electrolyzers are typically in the range between 1.85 V and 2.05 V. Unlike anion exchange membrane electrolysis in an acidic medium, the hydrogen evolution reaction (HER) is the limiting step for anion exchange membrane electrolysis in alkaline media. To this day, all efficient catalyst systems in anion exchange membrane electrolyzers are based on noble metal catalysts, even though this is theoretically not necessary in alkaline media and significantly more cost-effective materials like e.g. nickel can be used. This particular aspect is caused by the type of anion exchange membrane and the interaction between the membrane and the catalyst. Therefore, in particular, the catalyst must be further improved for the hydrogen evolution reaction, because said catalyst starts the reaction by converting water into hydrogen and hydroxide ions, which travel through the anion exchange membrane into the anodic half-cell, where they are oxidized and form molecular oxygen.

Furthermore, in known anion exchange membrane electrolyzers, it is necessary to use an anion exchange membrane, which is coated on both sides with a catalyst, in order to function sufficiently well. However, the production of anion exchange membranes coated on both sides is difficult due to the hygroscopic properties of the membrane and its tendency to shrink upon contact with wet agents. Thus, this so-called "Catalyst Coated Membrane" (CCM), i.e. the membrane coated on both sides with catalysts, must be produced in two steps and in a rather complicated process.

To date, there are no solutions to the stated problems, to be able to economically viably utilize anion exchange membrane electrolysis.

It would therefore be desirable to have an electrolyzer and a method available, which are improved in comparison to the electrolyzer described at the outset and the method of the kind described at the outset.

SUMMARY OF THE INVENTION

In a first aspect of the invention, an electrolyzer is provided for splitting molecular water into molecular hydrogen and molecular oxygen using electrical energy. The electrolyzer comprises an anodic half-cell with an anode and a cathodic half-cell with a cathode. The anodic half-cell and the cathodic half-cell are separated from each other by a separator. The anodic half-cell comprises an anodic electrolyte, which is in contact with the anode. The cathodic half-cell comprises a cathodic electrolyte, which is in contact with the cathode. The anodic half-cell comprises an anodic catalyst. The cathodic half-cell contains at least one cation complex for forming at least one mediator complex. The at least one cation complex is reducible to the mediator complex by taking up at least one electron at the cathode.

The mediator complex is a catalytically active chemical complex for splitting the molecular water ($H_2O$) into molecular hydrogen ($H_2$) and hydroxide ions ($OH^-$) while releasing at least one electron.

In a second aspect of the invention, a method is provided for splitting molecular water into molecular hydrogen and molecular oxygen using electrical energy. In the method, hydroxide ions are oxidized in an anodic half-cell with an anode with the involvement of an anodic catalyst. The anodic half-cell is separated from a cathodic half-cell with a cathode by a separator. The anodic half-cell comprises an anodic electrolyte, which is in contact with the anode. The cathodic half-cell comprises a cathodic electrolyte, which is in contact with the cathode. The molecular water ($H_2O$) is split in the cathodic half-cell into molecular hydrogen ($H_2$) and hydroxide ions ($OH^-$) with the involvement of at least one mediator complex. In the cathodic half-cell the at least one mediator complex is formed of at least one cation complex. The mediator complex is a catalytically active chemical complex for splitting the molecular water ($H_2O$) into molecular hydrogen ($H_2$) and hydroxide ions ($OH^-$) while releasing at least one electron. The at least one cation complex is reduced to the mediator complex by taking up at least one electron at the cathode.

BRIEF DESCRIPTION OF THE DRAWING FIGURES

The foregoing summary and the following description may be better understood in conjunction with the drawing figures, of which.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The invention relates to an electrolyzer for splitting molecular water into molecular hydrogen and molecular oxygen using electrical energy, which electrolyzer comprises an anodic half-cell with an anode and a cathodic half-cell with a cathode, wherein the anodic half-cell and the cathodic half-cell are separated from each other by a separator, wherein the anodic half-cell comprises an anodic electrolyte, which is in contact with the anode, and wherein the cathodic half-cell comprises a cathodic electrolyte, which is in contact with the cathode, wherein the anodic half-cell comprises an anodic catalyst, wherein the cathodic half-cell contains at least one cation complex for forming at least one mediator complex, wherein the at least one cation complex is reducible to the mediator complex by taking up at least one electron at the cathode, and wherein the mediator complex is a catalytically active chemical complex for splitting the molecular water ($H_2O$) into molecular hydrogen ($H_2$) and hydroxide ions ($OH^-$) while releasing at least one electron.

The proposed further development has several advantages. Due to the combination of the cation complex and the corresponding mediator complex, which basically forms a redox pair, an efficient splitting of water into molecular hydrogen and hydroxide ions in the anodic half-cell can be achieved. One advantage here is significantly improved reaction kinetics and consequently a reduction in the energy requirement, namely by reducing the potential required for the hydrogen evolution. Furthermore, the production of the catalyst-coated membrane is simplified because it now only has to be coated with a catalyst on its side facing the anode and not on both sides. The proposed system also enables electrolysis under high pressures, in particular up to about 60 bar of hydrogen pressure, such that the hydrogen generated is already pre-compressed and thus a subsequent compression is made easier and therefore more cost-effective. In addition, the system is cost-effective because an expensive catalyst like e.g. noble metals, in particular platinum, is not required. In addition, no complex catalyst layers on the cathode side of the anion exchange membrane are required for the hydrogen evolution reaction. A further advantage of the system is its longevity. The structure of the cathodic half-cell is simplified significantly and is impaired only minimally by decomposition processes. The use of the mediator complex makes it possible, in particular, to reduce the required cell voltage for the electrolysis of water. Because the cell voltage is directly proportional to the energy required for splitting water, the energy use can thus be significantly reduced, which makes it possible to significantly reduce operating costs of the electrolyzer, namely in particular the costs of providing electrical energy for electrolysis.

The at least one cation complex is preferably a catalytically inactive or substantially inactive chemical complex. A very stable cathodic half-cell can be formed in this way. The mediator complex that is formed through electron uptake by the cation complex is catalytically active.

Particularly good reaction kinetics, i.e. fast conversions, are possible when the cation complex and the mediator complex are dissolved in the cathodic electrolyte. This enables in particular a fast electron uptake by the cation complex and a fast electron release by the mediator complex.

It is favorable if the at least one cation complex is formed by at least one first central particle and at least one first ligand, which surrounds the at least one first central particle, if the mediator complex is formed by at least one second central particle and at least one second ligand, which surrounds the at least one second central particle, if the at least one first central particle and the at least one second central particle form a redox pair in such a way that the first central particle is reducible to the second central particle by taking up at least one electron, and if the at least one second central particle is oxidizable to the first central particle by releasing at least one electron. In other words, the central particles of the cation complex and the mediator complex are formed by an ion par that defines a redox pair. Such a redox pair is formed e.g. by vanadium ions $V^{2+}$ and $V^{3+}$. Only a water-soluble ligand, which surrounds the ions forming the redox pair, is required for complexing.

It is favorable if the at least one first central particle is a cation reducible by at least one oxidation state and if the at least one second central particle is the cation reduced by the at least one oxidation state. This makes it possible, in particular, for the cation complex with the reducible cation at the cathode to take up one or more electrons in order to form the mediator complex with the reduced cation. If the redox potential of the reducible cation complex is less than the redox potential of the hydrogen evolution reaction, the cell voltage overall can thus be lowered.

The electrolyzer can be configured particularly cost-effectively and stably if the reducible cation and the reduced cation are ions of different oxidation states of the same metal.

Particularly efficient water electrolyzers can be formed if the metal is a metal from the group of transition metals. In particular, it may be a metal from the group of lanthanides.

The transition metal is preferably ruthenium (Ru), chromium (Cr), vanadium (V), manganese (Mn), rhodium (Rh), cobalt (Co), or iron (Fe). These transition metals can easily form ions in different oxidation states.

The lanthanide is preferably europium (Eu) or cerium (Ce).

A highly efficient cathodic half-cell can be formed in a particularly simple manner if the cation complex is formed by one single first central particle and/or if the mediator complex is formed by one single second central particle. In particular, very simple systems can thus be realized.

It is favorable if the single first central particle of the cation complex is surrounded by at least three first ligands and/or if the mediator complex is surrounded by at least three second ligands. In particular, particularly stable complexes can thus be formed.

The structure of the cathodic half-cell can be further simplified if the at least one first ligand and the at least one second ligand are identical. For example, identical complexing agents may be provided, which form the first and second ligands, i.e. those particles that surround the central particles.

In particular, reaction kinetics can be improved by the at least one first ligand and/or the at least one of second ligand being configured in the form of a complexing agent. Ligands of that kind form an optimal configuration of the complexes of the system, which enables a fast electron uptake by the cation complex as well as a fast electron release by the mediator complex.

The complexing agent is preferably configured in the form of a complexing molecule. Complexing molecules of that kind may e.g. be easily dissolvable, in particular in water.

Particularly stable and cost-effective cathodic half-cells of anion exchange membrane electrolyzers can be formed if the at least one first ligand and/or the at least one second ligand is or contains mercaptoacetic acid, 2-mercaptopropionic acid, cysteamine, cysteine, cysteinmethylester, or catechol.

The electrolyzer can be produced in a simple manner if the at least one first central particle is introduced into the cathodic electrolyte by dissolving a salt, which contains the at least one first central particle. For example, $V^{3+}$ ions can be formed by dissolving vanadium (III)-chloride in water.

It is further favorable if the at least one first ligand and/or the at least one second ligand is introduced into the cathodic electrolyte by dissolving. This simplifies the design of the cathodic half-cell. In addition, the cation complex can be configured in a simple manner if both the at least one first central particle and the at least one first ligand and/or the at least one second ligand are dissolved in the cathodic electrolyte.

The structure of the electrolyzer can be further simplified if the separator is configured in the form of an anion exchange membrane. Such a membrane can be penetrated exclusively by anions, but not by cations, which form the central particles of the cation complex and the mediator complex.

It is favorable if the anion exchange membrane is configured to be permeable to hydroxide ions. The hydroxide ions generated in the cathodic half-cell upon splitting water can thus travel into the anodic half-cell and there be oxidized to molecular oxygen while releasing electrons and forming water.

It is advantageous if the cathodic electrolyte is water or an aqueous solution and/or if the anodic electrolyte is water or an aqueous solution. Thus in particular a cost-effective electrolyzer can be formed. In particular, a pH value can be set in a desired manner in aqueous solutions.

The anodic electrolyte favorably has a pH value of at least about 7. The pH value of the anodic electrolyte is preferably at least about 9. The oxygen evolution reaction takes place advantageously in such an alkaline milieu.

The cathodic electrolyte preferably has a pH value in a range from 0 to about 9. The complexing of the cation complex is supported with such a pH value. In addition, e.g. protons can also be split from the ligands upon complexing and can contribute to making the cathodic electrolyte more acidic.

It is favorable if a pH value of the anodic electrolyte and a pH value of the cathodic electrolyte are different and define a pH gradient. This makes it possible in particular to achieve different milieus in the cathodic half-cell and in the anodic half-cell, for example an acidic milieu in the cathodic half-cell and an alkaline milieu in the anodic half-cell. In particular, an acidic milieu in the cathodic half-cell and a neutral pH value in the anodic half-cell or an alkaline pH value in the anodic half-cell and a neutral pH value in the cathodic half-cell are also possible. Due to different pH values of the anodic electrolyte and the cathodic electrolyte, cost-effective catalysts may, in particular, be used both in the cathodic half-cell and in the anodic half-cell. Noble metal catalysts can thus be forgone.

It is advantageous if the pH gradient is at least 1. In particular, it may be at least 3. Further, it may be, in particular, at least 5. The pH gradient is preferably set such that the desired catalysts can be used both in the anodic and in the cathodic half-cell.

In order to keep the pH value in the cathodic cell at a desired value, it is favorable if the cathodic half-cell contains a pH value regulator.

The pH value regulator preferably is or contains hydrochloric acid (HCl), sulfuric acid ($H_2SO_4$), acetic acid, phosphoric acid, and/or a phosphoric acid buffer. The stated acids and buffers are excellently suited to keep a pH value in the cathodic half-cell at a desired value.

The electrolyzer can be configured in a simple manner if the anode consists of the anodic catalyst or is made of the anodic catalyst or contains the anodic catalyst or is coated with the anodic catalyst or is electrically conductively in contact with the anodic catalyst. These embodiments enable an efficient oxygen evolution reaction in the anodic half-cell.

The electrolyzer can be configured in a particularly simple and compact manner if the separator is coated with the anodic catalyst or is electrically conductively in contact with the anodic catalyst. Thus, for example, an anion exchange membrane coated on one side with the anodic catalyst may be used as the separator in the electrolyzer.

The anode can be configured in a simple manner if it is of solid or reticular configuration.

It is advantageous if the anodic catalyst is nickel, iridium, or cobalt, or contains nickel, iridium, and/or cobalt. In particular, the anodic catalyst may be or contain $NiO_x$, $NiCeO_x$, $NiCoO_x$, $NiCuO_x$, $NiFeO_x$, $NiLaO_x$, $IrO_x$, $CoFeO_x$ or $CoO_x$.

The electrolyzer can be configured in a particularly simple and cost-effective manner if the cathode is made of carbon or stainless steel. In particular, it is not necessary to coat the cathode with a catalyst. Cathodes of carbon or stainless steel can, in particular, be produced in a cost-effective manner.

The invention further relates to a method for splitting molecular water into molecular hydrogen and molecular oxygen using electrical energy, in which method hydroxide ions are oxidized in an anodic half-cell with an anode with the involvement of an anodic catalyst, wherein the anodic half-cell is separated from a cathodic half-cell with a cathode by a separator, wherein the anodic half-cell comprises an anodic electrolyte, which is in contact with the anode, and wherein the cathodic half-cell comprises a cathodic electrolyte, which is in contact with the cathode, wherein the molecular water ($H_2O$) in the cathodic half-cell is split into molecular hydrogen ($H_2$) and hydroxide ions ($OH^-$) with the involvement of at least one mediator complex, wherein in the cathodic half-cell the at least one mediator complex is formed from at least one cation complex, wherein the mediator complex is a catalytically active chemical complex for splitting the molecular water ($H_2O$) into molecular hydrogen ($H_2$) and hydroxide ions ($OH^-$) while releasing at least one electron, and wherein the at least one cation complex is reduced to the mediator complex by taking up at least one electron at the cathode.

As already described above, an electrochemical process, namely the conversion of the reducible cation complex into the mediator complex by electron uptake, can thus be combined with a chemical process, namely the hydrogen evolution in the presence of the mediator complex by electron uptake from the mediator complex. In particular, a cell voltage of the electrolyzer can thus be significantly reduced compared to conventional electrolyzers with noble metal catalysts, in particular in the cathodic half-cell. Thus in particular, for one, the operating costs can be lowered, because a lower cell voltage is directly linked to a lower electrical power consumption by the electrolyzer, as well as investment costs, because in particular cost-effective catalysts can be used both in the anodic half-cell and in the cathodic half-cell.

Preferably a catalytically inactive or substantially inactive chemical complex is used as the at least one cation complex. This has the advantage, in particular, that such a cation complex can be formed by dissolving the at least one first central particle and the at least one first ligand in the cathodic electrolyte. A particularly stable cathodic half-cell can thus be realized.

The cathodic half-cell can be configured in a simple manner if the cation complex and the mediator complex are dissolved in a cathodic electrolyte.

In accordance with the invention, it is advantageous if the at least one cation complex is formed by at least one first central particle and at least one first ligand, which surrounds the at least one first central particle, if the mediator complex is formed by at least one second central particle and at least one second ligand, which surrounds the at least one second central particle, if the at least one first central particle and the at least one second central particle form a redox pair in such a way that that first central particle is reduced to the second central particle by taking up at least one electron and that the at least one second central particle is oxidized to the first central particle by releasing at least one electron. Further developing the method in this way makes it possible in particular to take up electrons at the cathode with the cation complex and to directly support as a catalytically active mediator complex the splitting of water while releasing one or more electrons.

A cation reducible by at least one oxidation state by means of electron uptake at the cathode is preferably used as the at least one first central particle, and the at least one second central particle is preferably the cation reduced by the at least one oxidation state. The reducible cation can thus take up at least one, in particular two or more electrons from the cathode and can then release said electrons as central particles of the catalytically active mediator complex for directly forming molecular hydrogen and hydroxide ions. The reducible cation thus serves as the central particle of the cation complex as an electron carrier, so that the hydrogen evolution reaction can take place not only at the cathode, as is the case with conventional electrolyzers, but rather everywhere in the cathodic half-cell.

The method can be performed in a particularly simple manner if ions of different oxidation states of the same metal are used as the reducible cation and the reduced cation.

It is favorable if a metal from the group of transition metals, in particular from the group of lanthanides, is used as the metal. These form, in a simple manner, redox pairs, namely e.g. $V^{2+}/V^{3+}$, $Cr^{2+}/Cr^{3+}$ or $Fe^{2+}/Fe^{3+}$.

Preferably ruthenium (Ru), chromium (Cr), vanadium (V), manganese (Mn), rhodium (Rh), cobalt (Co), or iron (Fe) is used as the transition metal.

Europium (Eu) or cerium (Ce) is favorably used as the lanthanide.

A particularly simple system in the cathodic half-cell can be configured if the cation complex is formed by one single first central particle and/or if the mediator complex is formed by one single second central particle.

Particularly stable complexes can be formed in particular by the single first central particle of the cation complex being surrounded by at least three first ligands, and/or by the mediator complex being surrounded by at least three second ligands.

The method can be further simplified if the at least one first ligand and the at least one second ligand are used identically. For example, one single form of a complexing agent may be used in order to form both the cation complex and the mediator complex with the redox pair as the central particles of the complexes.

Both the cation complex and the mediator complex can be produced in a simple manner if the at least one first ligand and/or the at least one second ligand are configured in the form of a complexing agent.

The complexing agent is preferably configured in the form of a complexing molecule. Complexing molecules of that kind may e.g. be easily dissolvable, in particular in water.

Simple and cost-effective methods can be performed if mercaptoacetic acid, 2-mercaptopropionic acid, cysteamine, cysteine, cysteinmethylester, or catechol is used as the at least one first ligand and/or the at least one second ligand.

It is favorable if the at least one first central particle is introduced into the cathodic electrolyte by dissolving a salt. In particular, it may be a transition metal salt. For example, it may be a vanadium salt or a chromium salt or an iron salt. In particular, a concentration of the reducible cation in the cathodic half-cell can thus be set in a simple manner.

The at least one first ligand and/or the at least one second ligand is preferably introduced into the cathodic electrolyte by dissolving. This makes it possible to perform the method in a simple manner.

It is advantageous if the separator is configured in the form of an anion exchange membrane. Such a separator allows only anions to travel from the cathodic half-cell into the anodic half-cell, but not protons in the reverse direction. This enables optimal control of the water splitting.

The anion exchange membrane is favorably configured to be permeable to hydroxide ions. The hydroxide ions formed in the cathodic half-cell upon splitting water are thus able to travel into the anodic half-cell and there be oxidized to molecular oxygen.

An electrolyzer can be configured to be easily handleable and cost-effective if water or an aqueous solution is used as the cathodic electrolyte and/or if water or an aqueous solution is used as the anodic electrolyte. In particular, pH values of aqueous solutions can be set to a desired value in a simple manner.

It is favorable if the anodic electrolyte is used having a pH value of at least about 7, in particular at least about 9. A basic milieu can thus be created in the anodic half-cell in order to support the oxygen evolution reaction.

In order to support the hydrogen evolution reaction, it is advantageous if the cathodic electrolyte is used having a pH value in a range from 0 to about 9.

In order to optimize the hydrogen evolution reaction in the cathodic half-cell and the oxygen evolution reaction in the anodic half-cell, it is favorable if an anodic electrolyte and a cathodic electrolyte having different pH values are used and define a pH gradient. In particular, this makes it possible to use cathodic and anodic catalysts, which optimally support the hydrogen evolution reaction and the oxygen evolution reaction, respectively. In addition, catalysts can be used that are not noble metals. Thus, in particular investment costs in creating electrolyzers can be minimized.

It is advantageous if anodic and cathodic electrolytes are used, such that the pH gradient is at least 1. In particular, it may be at least 3. Further particularly, the pH gradient may be at least 5. The pH gradient is preferably selected or set such that the hydrogen evolution reaction and the oxygen evolution reaction take place optimally.

A pH value regulator is advantageously added to the cathodic half-cell. The pH value in the cathodic half-cell can thus be kept at a desired value.

A pH value in the cathodic half-cell can be regulated in a simple manner if hydrochloric acid (HCl), sulfuric acid ($H_2SO_4$), acetic acid, phosphoric acid, and/or a phosphoric acid buffer is added as the pH value regulator.

In accordance with a preferred embodiment of the invention, provision may be made for an anode to be configured in such a way that it consists of the anodic catalyst or is made of the anodic catalyst or contains the anodic catalyst or is coated with the anodic catalyst or is electrically conductively in contact with the anodic catalyst. Configuring the anode in that way can ensure, in particular, that the oxygen evolution reaction can take place in a desired manner in the anodic half-cell.

An electrolysis cell can be realized and thus a method in accordance with the invention performed in a simple manner if the separator is coated with the anodic catalyst or is electrically conductively brought into contact with the anodic catalyst. In particular, an anion exchange membrane catalytically coated on one side can thus be used for performing the method.

It is favorable if the anode is of solid or reticular configuration. This makes it possible, in particular, to configure the anode in a simple manner.

A particularly efficient oxygen evolution reaction can be achieved if an anodic catalyst is used, which contains nickel, iridium, or cobalt, or contains nickel, iridium, and/or cobalt. In particular, the anodic catalyst may be or contain $NiO_x$, $NiCeO_x$, $NiCoO_x$, $NiCuO_x$, $NiFeO_x$, $NiLaO_x$, $IrO_x$, $CoFeO_x$ or $CoO_x$.

The method can be performed in a cost-effective manner if the cathode is made of carbon or stainless steel.

Furthermore, the use of one of the electrolyzers described above is proposed for performing one of the methods described above. Thus, in particular, hydrogen can be produced simply and cost-effectively with high efficiency.

Figure 1:
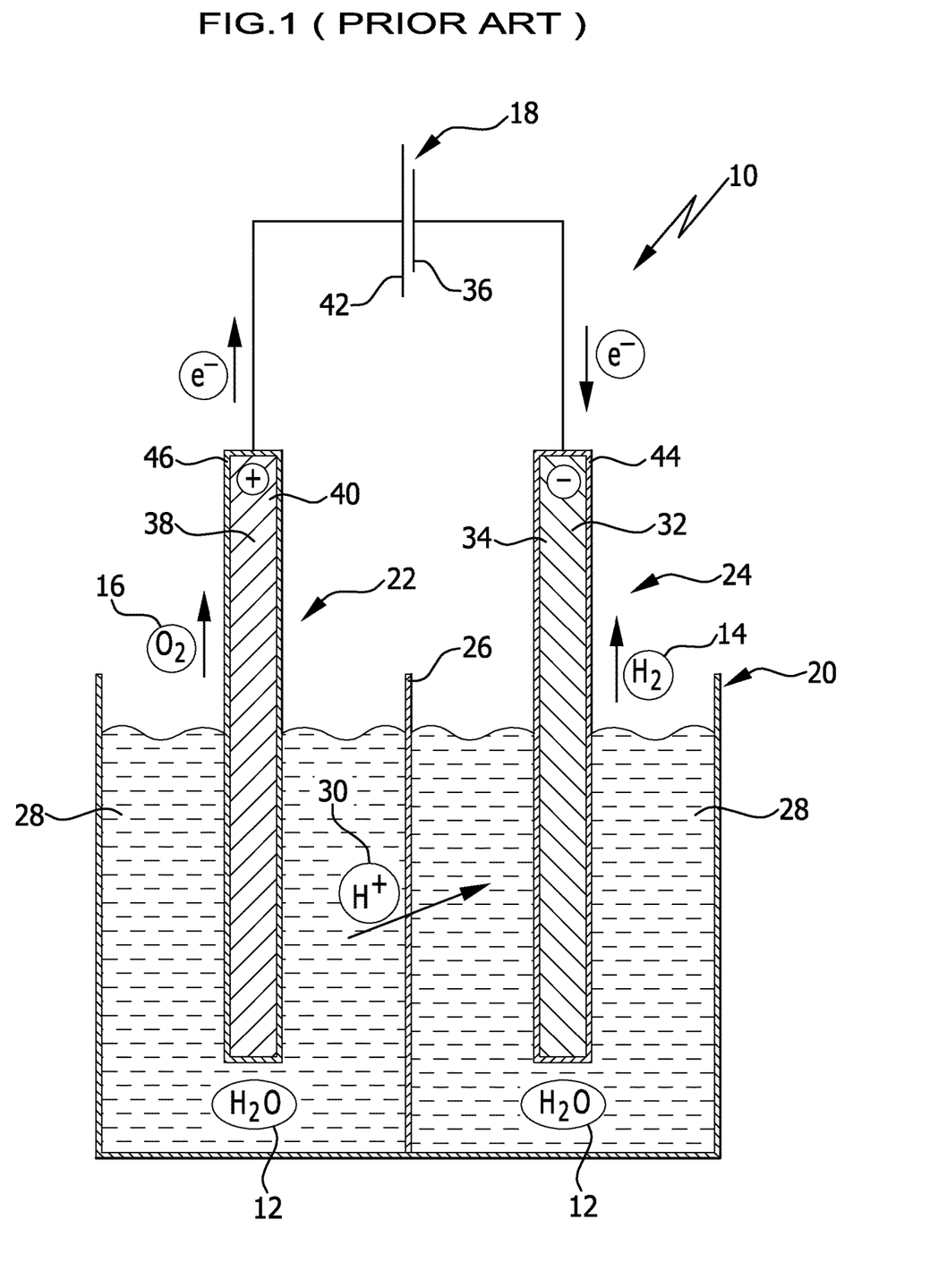
FIG. 1: shows a schematic depiction of the structure of an embodiment of an electrolyzer, as it is known from the prior art.

An embodiment of an electrolyzer known from the prior art for splitting water 12 into hydrogen 14 and oxygen 16 using electrical energy that is provided by voltage source 18 is schematically depicted in FIG. 1.

The electrolyzer 10 comprises an electrolysis cell 20, which comprises an anodic half-cell 22 and a cathodic half-cell 24. The two half-cells 22 and 24 are separated from each other by a separator 26.

The two half-cells 22 and 24 are filled with an electrolyte 28. If the separator 26 is configured in the form of a proton exchange membrane (PEM), the electrolyte 28 has a pH value in the neutral range, thus defining a neutral milieu, namely both in the anodic half-cell 22 and in the cathodic half-cell 24. The proton exchange membrane is permeable exclusively to protons 30, i.e. $H^+$ ions.

Dipping into the cathodic half-cell 24 is an electrode 32 in the form of a cathode 34, which is electrically conductively connected to the negative pole 36 of the voltage source 18.

Dipping into the anodic half-cell 22 is an electrode 38 in the form of an anode 40, which is electrically conductively connected to the positive pole 42 of the voltage source 18.

In the embodiment of the electrolyzer 10 depicted in FIG. 1, the cathode 34 is made of an electrically conductive material, for example stainless steel or carbon, and is coated with a cathodic catalyst 44. The cathodic catalyst 44 is platinum.

The anode 40 is also made of an electrically conductive material, which must be corrosion-resistant, for example titanium, and is coated with an anodic catalyst 46. Said catalyst is iridium.

Figure 2:
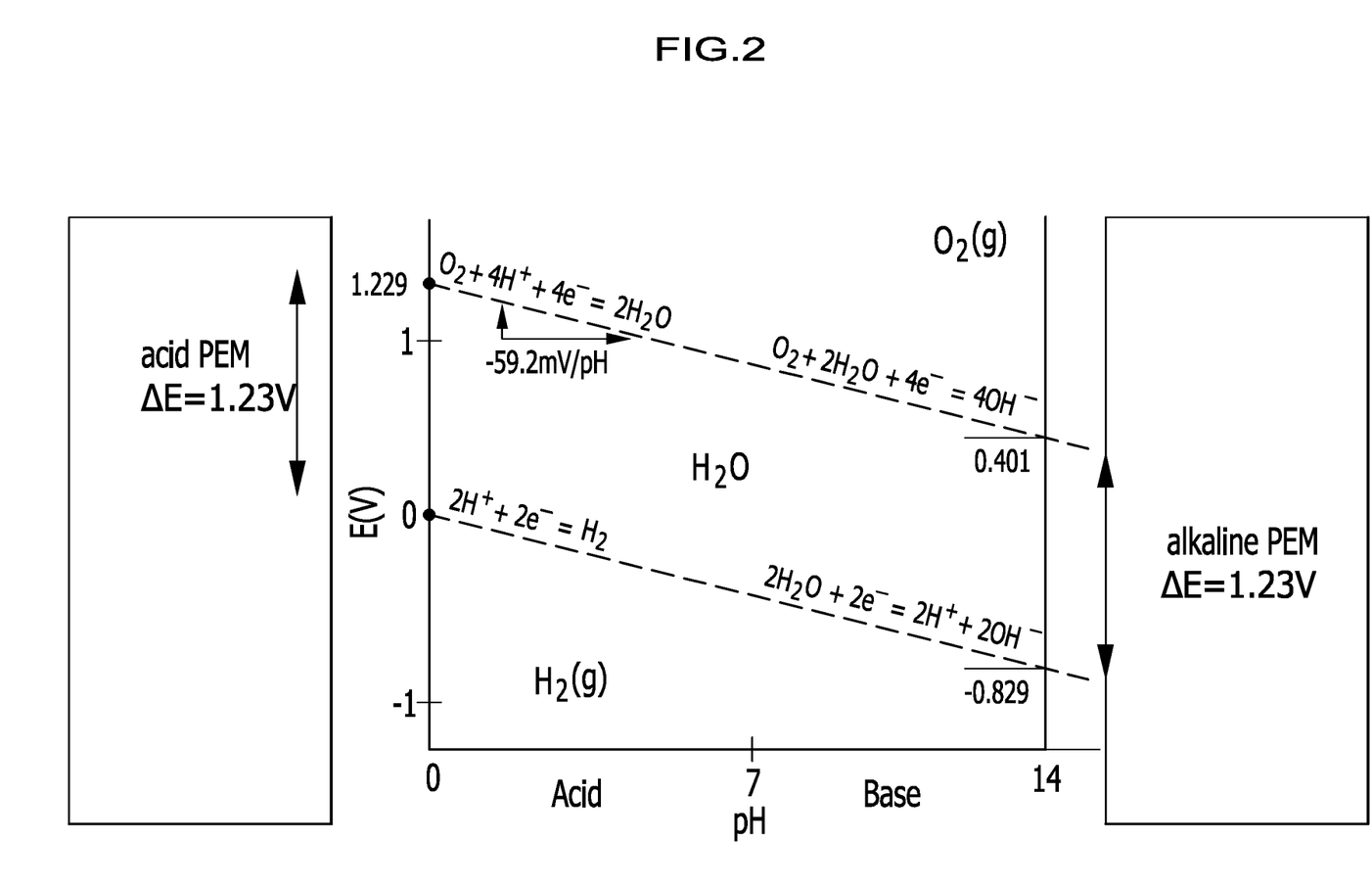
FIG. 2: shows a schematic depiction of the electrode potential difference of the water splitting reaction in an acidic and an alkaline medium.

In FIG. 2, the corresponding electrochemical potentials of the electrolyzer 10 are schematically depicted. The cell voltage required for splitting water 12 into hydrogen 14 and oxygen 16 is about 1.23 Volt. If the electrolyte 28 has an acidic pH value, protons 30 produced in the anodic half-cell 22 move through the separator 26 to the cathode 34 and are reduced there, supported by the cathodic catalyst 44, to molecular hydrogen 14 after taking up electrons ($e^-$).

The hydroxide ions ($OH^-$) disassociated from water molecules move to the anode 40 and are converted into molecular oxygen 16 and water 12 while releasing electrons. If the electrolyte 28 has a neutral pH value, molecular oxygen and protons 30 arise in the anodic half-cell 22 through the oxidation of water 12 at the anodic catalyst 46. The protons 30 move, due to the opposite charge, through the separator 26 to the cathode 34.

If the separator 26 is replaced by an anion exchange membrane that is permeable to hydroxide ions and an alkaline electrolyte 28 is selected, then the cell voltage required for electrolysis is maintained, as is shown schematically in FIG. 2.

If the electrolyzer 10 is operated in an alkaline milieu, nickel may be used as the anodic catalyst 46 and cobalt and/or manganese may be used as anodic catalysts 44. The disadvantage of an alkaline electrolyte 28, however, is that hydroxide ions must be constantly supplied. In addition, strongly alkaline electrolytes 28 are highly corrosive.

Figure 3:
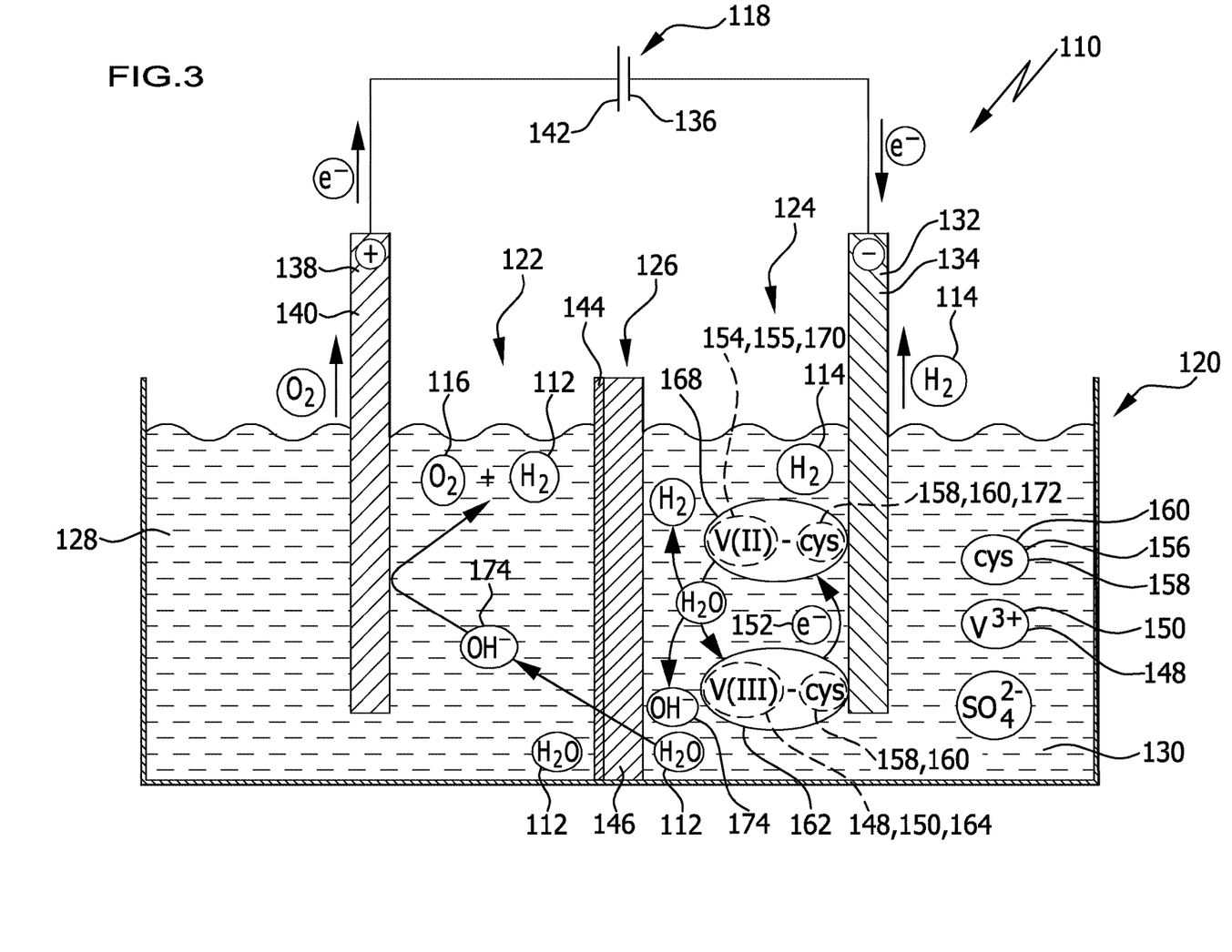
FIG. 3: shows a schematic depiction of an embodiment of an electrolyzer in accordance with the invention.

FIG. 3 shows schematically an embodiment of an electrolyzer 110 in accordance with the invention. It, too, serves to split water 112 into molecular hydrogen 114 and molecular oxygen 116. Electrical energy is also used here, which is provided by a voltage source 118.

The electrolyzer 110 comprises an electrolysis cell 120 with an anodic half-cell 122 and a cathodic half-cell 124. The half-cells 122 and 124 are separated from each other by a separator 126.

The anodic half-cell 122 is filled with an anodic electrolyte 128, the cathodic half-cell 124 with a cathodic electrolyte 130.

An electrode 132 in the form of a cathode 134 dips into the cathodic electrolyte 130 of the cathodic half-cell 124. The cathode 134 is electrically conductively connected to the negative pole 136 of the voltage source 118.

An electrode 138 in the form of an anode 140 dips into the anodic electrolyte 128 of the anodic half-cell 122. The anode 140 is electrically conductively connected to the positive pole 142 of the voltage source 118.

In one embodiment of the electrolyzer 110, the anode 140 consists of the anodic catalyst 144.

In another embodiment, the anode 140 is made of the anodic catalyst 144.

In a further embodiment, the anode 140 contains the anodic catalyst 144.

In a further embodiment, the anode 140 is coated with the anodic catalyst 144.

In a further embodiment, the anode 140 is electrically conductively in contact with the anodic catalyst 144.

In the embodiment depicted in FIG. 3, the anode 140 is of solid configuration.

In a further embodiment, the anode 140 is of reticular configuration.

The separator 126 is configured in the form of an anion exchange membrane 146. It is coated with the anodic catalyst 144 on its side surface facing toward the anodic half-cell 122.

In the embodiment depicted in FIG. 3, the anodic catalyst 144 is nickel. In a further embodiment, the anodic catalyst 146 is iridium or cobalt or contains nickel, iridium and/or cobalt. In further embodiments, the anodic catalyst is or contains $NiO_x$, $NiCeO_x$, $NiCoO_x$, $NiCuO_x$, $NiFeO_x$, $NiLaO_x$, $IrO_x$, $CoFeO_x$ or $CoO_x$.

In the embodiment depicted in FIG. 3, the cathode 34 is made of carbon.

In a further embodiment, the cathode 34 is made of stainless steel.

Unlike in the embodiment of the electrolyzer 10, the reduction of the protons 130 does not take place at the cathode 134. A different mechanism is used in the case of the electrolyzer 110. Here, reducible cations 148 are dissolved in the cathodic electrolyte 128 for this purpose. The reducible cations 148 are $V^{3+}$ ions 150.

The reducible cations 148 can be reduced to reduced cations 154 by taking up an electron 152.

The reducible cation 148 is introduced into the cathodic electrolyte 130 by dissolving a salt, which contains the reducible cations 148.

The reducible cations 148 do not directly take up electrons 152 at the cathode 134, however.

A complexing agent 156 in the form of a complexing molecule 158 is introduced into the cathodic electrolyte 130. In the embodiment described, the complexing molecule 158 is cysteine 160.

Together with the cysteine 160, the reducible cation 148, i.e. the $V^{3+}$ ion 150, forms a cation complex 162. The reducible cation forms a first central particle 164 of the cation complex 162, which comprises three first ligands 166 surrounding the first central particle 164. The first ligands 166 are formed by the complexing molecule 158, i.e. by cysteine 160.

The cation complex 162 is a catalytically inactive or substantially inactive chemical complex.

When the cation complex 162 takes up an electron 152 at the cathode 134, the reducible cation 148, i.e. the $V^{3+}$ ion 150, is reduced and is converted into the reduced cation 154 in the form of the $V^{2+}$ ion 155. This results in a mediator complex 168 with the reduced cation 154 as the second central particle 170, which is surrounded by three second ligands 172, said three second ligands 172 being cysteine 160. The first ligands 166 and the second ligands 172 are thus identical in the described embodiment.

The mediator complex 168 is a catalytically active chemical complex. Said mediator complex 168 supports or brings about the splitting of molecular water 112 into molecular hydrogen 114 and hydroxide ions 174 while releasing an electron 152. Upon splitting water 112, the mediator complex 168 is thus reconverted into the cation complex 162. Said cation complex 162 can then again take up an electron 152 at the cathode 134 and be converted into the mediator complex 168.

The hydroxide ions 174 travel through the anion exchange membrane 146, which is permeable only to anions, i.e. in particular the hydroxide ions 174, into the anodic half-cell 122 and are oxidized to molecular oxygen 118 by releasing electrons to the anode 140 while forming water 112. The anodic catalyst 144 serves to support the oxygen evolution reaction.

Figure 5:
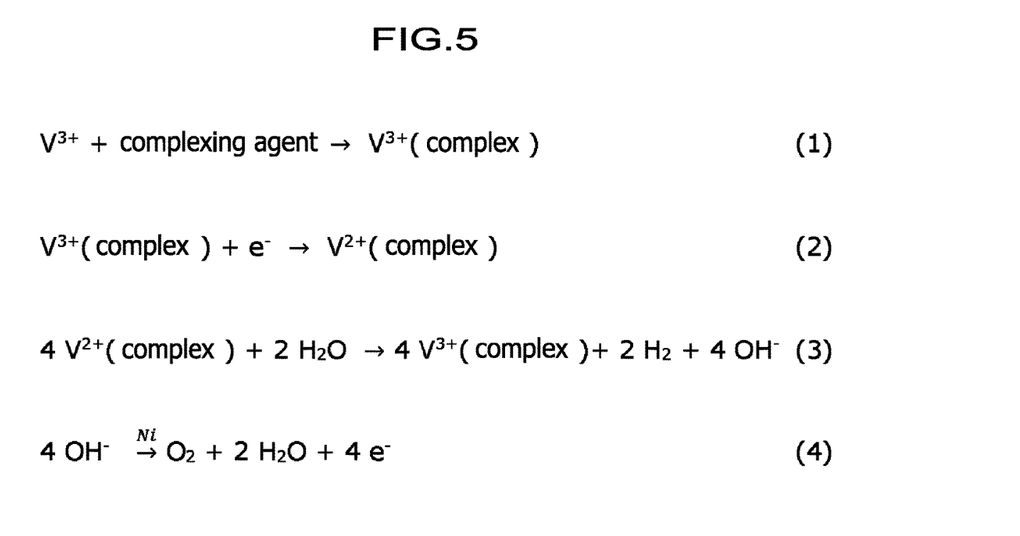
FIG. 5: shows an overview of the reaction equations in the cathodic half-cell (1), (2), and (3), as well as at the anode (4)

The relevant reaction equations of the processes described are depicted in FIG. 5.

Equation (1) represents the formation of the cation complex 162.

The conversion of the cation complex 162 by the uptake of an electron 152 into the mediator complex 168 is described by equation (2).

The actual splitting of the water 112 is indicated by equation (3).

Equation (4) describes the oxygen evolution reaction in the anodic half-cell 122 with nickel as the anodic catalyst 144.

Figure 6:
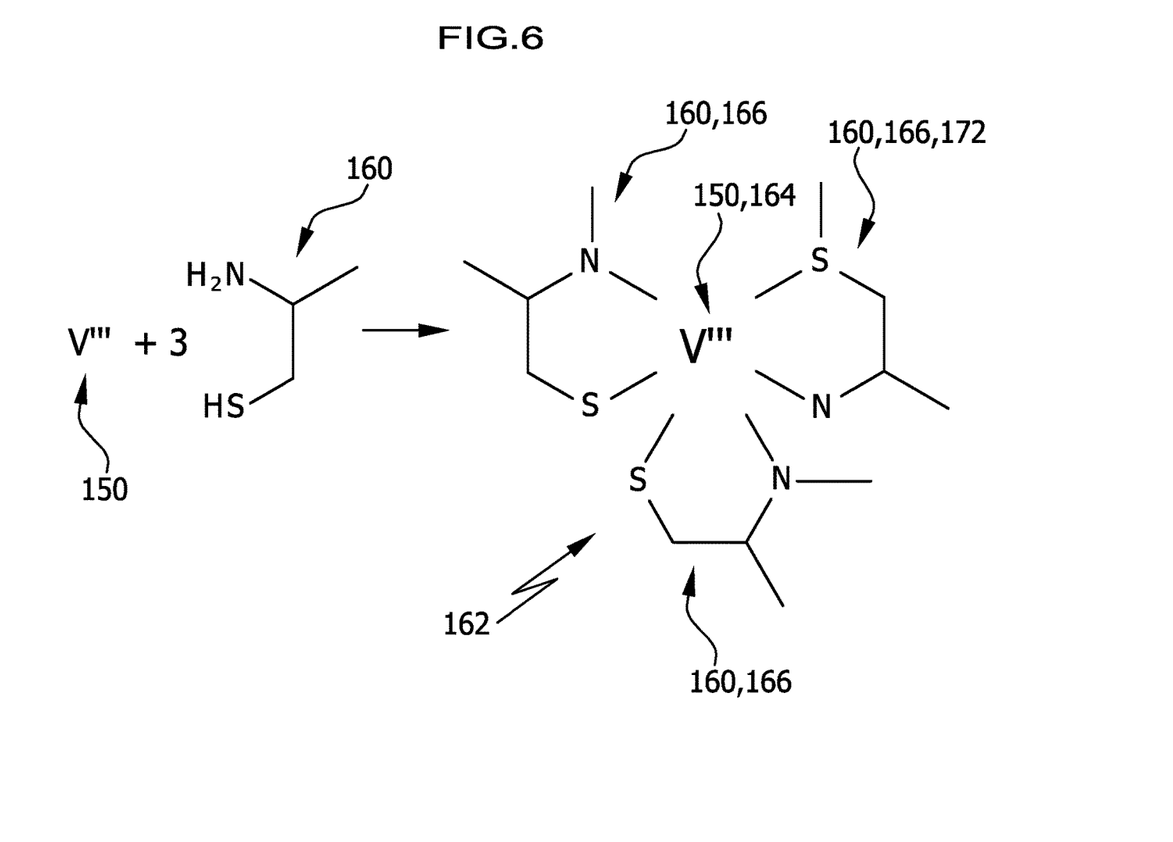
FIG. 6: shows a schematic depiction of an embodiment upon the formation of the cation complex with a first central particle and three ligands.
Figure 7:
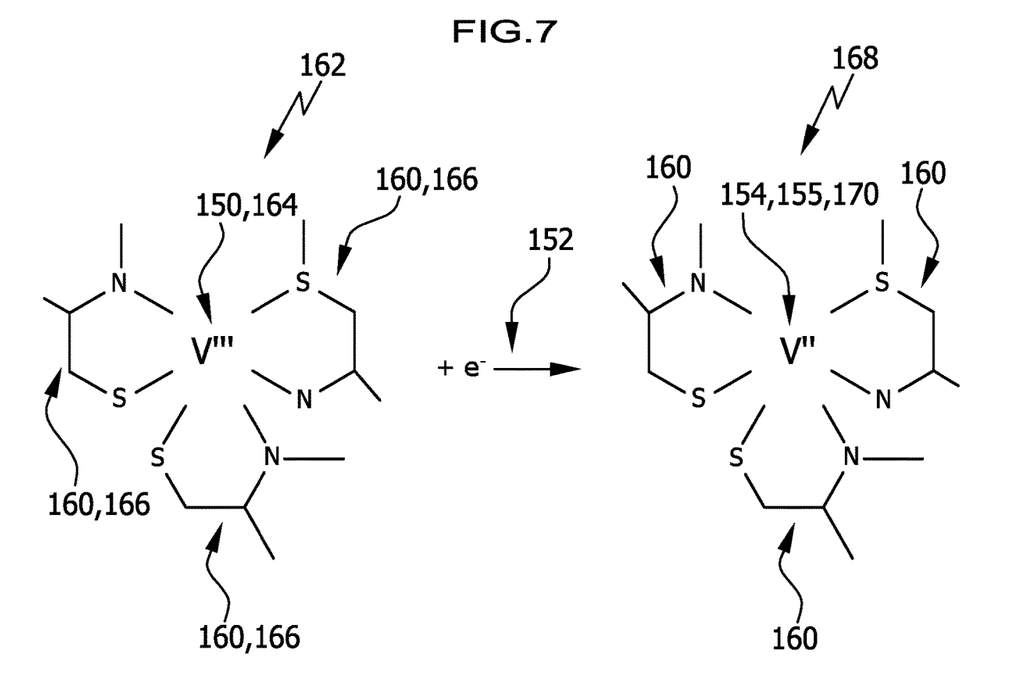
FIG. 7: shows a schematic depiction of an embodiment upon the conversion of the cation complex into the mediator complex by electron uptake.
Figure 8:
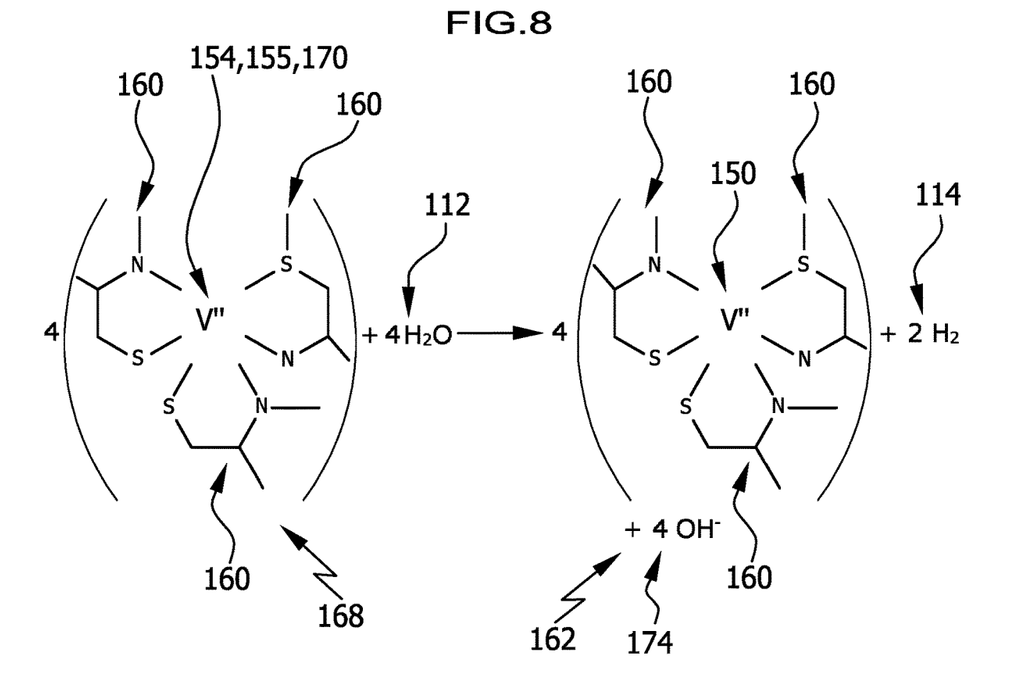
FIG. 8: shows a schematic depiction of an embodiment upon the splitting of water into molecular hydrogen and hydroxide ions by converting the mediator complex into the cation complex while releasing one or more electrons.

FIGS. 6 to 8 illustrate the reaction equations (1), (2) and (3) that take place in the anodic half-cell 122.

FIG. 6 schematically shows the formation of the cation complex 162.

The conversion of the cation complex into the mediator complex 168 is schematically depicted in FIG. 7.

Finally, FIG. 8 shows the splitting of water 112 into molecular hydrogen 114 and hydroxide ions 174 while simultaneously reconverting the mediator complex 168 into the cation complex 162.

Water 112 or an aqueous solution is used both as the cathodic electrolyte 130 and as the anodic electrolyte 128. A pH value of the anodic electrolyte 128 is set to a value of at least 7, in particular at least 9. Thus, a basic milieu prevails in the anodic half-cell 122.

The cathodic electrolyte 130 is set such that it has a pH value in a range from 0 to about 9.

The pH values of the anodic electrolyte 128 and the cathodic electrolyte 130 are preferably different and define a pH gradient.

In order to keep the pH value of the cathodic electrolyte 130 stable, in the embodiment described the cathodic half-cell 124 contains a pH value regulator. This pH value regulator is sulfuric acid ($H_2SO_4$).

In alternative embodiments, the pH value regulator is formed by hydrochloric acid (HCl), acetic acid, phosphoric acid, and/or a phosphoric acid buffer.

The described electrolyzer 110 has a theoretic cell potential of 0.66 V. The partial reaction according to equation (2) in FIG. 5 defines a potential of −0.26 Volt. The potential of the reaction equation (3) in FIG. 5 indicating the water splitting is 0 V.

As already mentioned at the outset, the potential of the oxygen evolution reaction according to equation (4) in FIG. 5 is 0.401 V, such that the cell potential as the sum of the potentials of the partial reactions according to equations (2) and (4) in FIG. 5 add up to the theoretical cell potential of 0.66 V. This is thus significantly below the value stated at the outset of currently used anion exchange membrane electrolyzers.

In the embodiment of the electrolyzer 110, vanadyl sulfate ($VOS_4$) is used, namely from the company Sigma-Aldrich® with the product number 233706. This is blue powder or blue crystals that contain stored water.

In further embodiments, $Cr^{3+}$ and/or $Fe^{3+}$ are used as reducible cations 148, which in their reduced form as reduced cations 154 $Cr^{2+}$ and $Fe^{2+}$, respectively, form redox pairs in the form of $Cr^{3+}/Cr^{2+}$ and $Fe^{3+}/Fe^{2+}$, respectively.

These alternative redox pairs can be introduced into the cathodic electrolyte 130 by dissolving appropriate salts, i.e. by dissolving chromium or iron salts.

In further embodiments, reducible metal ions of the transition metals ruthenium (Ru), manganese (Mn), rhodium (Rh), or cobalt (Co) are used.

In further embodiments, reducible metal ions of the lanthanides europium (Eu) or cerium (Ce) are used.

By dissolving the complexing molecule 158, an acidic milieu is created in the cathodic half-cell 124.

FIG. 4 again shows the electrolysis process, depicted somewhat enlarged. It can be easily seen that a continuous process of the conversion of the cation complex 162 into the mediator complex 168 takes place in the cathodic half-cell 124. By the mediator complex 168 releasing electrons, water 112 can be split and the mediator complex 168 can again be converted into the cation complex 162, which can take up an electron 152 from the cathode 134.

Figure 4:
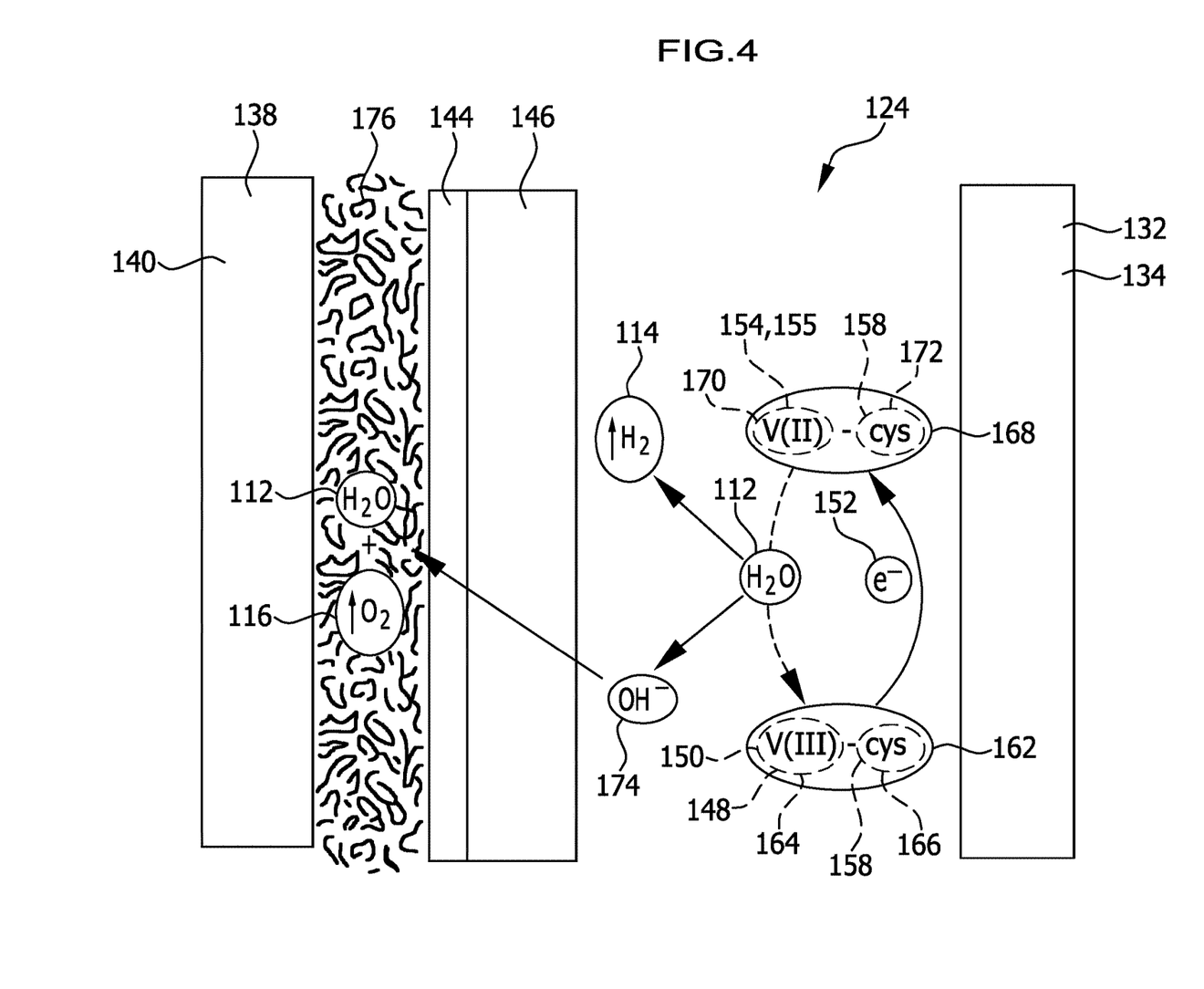
FIG. 4: shows a schematic depiction of an embodiment of an electrochemical cell in accordance with the invention.

It is schematically depicted in FIG. 4 that a porous transport layer 176 made of stainless steel is arranged between the anion exchange membrane 146 and the anode 140. This facilitates the discharge of the gaseous oxygen 116 that is created.

The described embodiment of the electrolyzer 110 thus has the advantage that it can be operated with a significantly lower cell voltage. Because the power consumption of the electrolyzer 10 or 110 is defined by the product of current and voltage and the input power is directly correlated with the conversion of water 112 to hydrogen 114 and oxygen 116, the lowering of the cell voltage means that the input power is reduced and thus the operating costs, in particular for electrical energy, are significantly reduced in the case of the electrolyzer 110 in comparison to conventional electrolyzers 10.

The proposed configuration of the electrolyzer 110 enables in particular the use of more cost-effective catalysts 144 for the anodic half-cell 122. A catalyst is not required per se in the cathodic half-cell 124. The catalytic property of the mediator complex 168 makes the use of a cathodic catalyst superfluous.

In particular, the use of noble metals as cathodic catalysts can thus be entirely foregone.

The configuration of the mediator complex 168 can be achieved in a cost-effective and simple manner. Only a complexing agent 156 is required. Cysteine 160 is environmentally compatible and is available at a low cost.

Furthermore, the hydrogen evolution reaction can take place with high reaction kinetics, because the mediator complex 168 is available everywhere in the cathodic half-cell 124 for splitting water.

In addition, water may be used as electrolyte 128 and 130, respectively. The risk of corrosion of the electrolyzer 110 can thereby be minimized. The use of weakly acidic electrolytes 130 and weakly alkaline anodic electrolytes 128 is also possible.

The disadvantages of conventional electrolyzers 10 can be overcome by the described electrolyzer 110.

The electrolyzer 110 may be used in particular to produce hydrogen 114 from water 112 using electrical energy that is provided by renewable energies. The requirements with respect to costs and safety that are necessary are significantly lower than in the case of electrolyzers 10 in accordance with the prior art. Hydrogen 114 can also be produced with a degree of purity.

If one takes into account that the global demand for hydrogen is about 60 million per year and is constantly increasing, with current electrolyzers 10 a total amount of about 330 million tons of carbon dioxide is released into the atmosphere in producing the hydrogen when fossil fuels are used to provide the electrical energy.

The production of carbon dioxide can be reduced to zero by using electrical energy from renewable energies. This is basically also possible with electrolyzers 10.

In each case, the acquisition costs and operating costs for the electrolyzer 110 are significantly lower in comparison to the electrolyzer 10, and thus the costs for the production of hydrogen 114 are also lower. The proposed electrolyzer 110 makes it possible, in other words, to provide more hydrogen 114 for new propulsion technologies with the same expenditure in costs and energy, and to nonetheless significantly reduce $CO_2$ emissions.

The described electrolyzers 110 can be used, in particular, for the electrolysis of water 112, i.e. in particular for producing hydrogen 114 and for storing electrical energy.

REFERENCE NUMERAL LIST 10 electrolyzer
12 water
14 hydrogen
16 oxygen
18 voltage source 20 electrolysis cell
22 anodic half-cell
24 cathodic half-cell
26 separator
28 electrolyte
30 proton
32 electrode
34 cathode
36 negative pole
38 electrode
40 anode
42 positive pole
44 cathodic catalyst
46 anodic catalyst
110 electrolyzer
112 water
114 hydrogen
116 oxygen
118 voltage source
120 electrolysis cell
122 anodic half-cell
124 cathodic half-cell
126 separator
128 anodic electrolyte
130 cathodic electrolyte
132 electrode
134 cathode
136 negative pole
138 electrode
140 anode
142 positive pole
144 anodic catalyst
146 anion exchange membrane
148 reducible cation
150 $V^{3+}$ ion
152 electron
154 reduced cation
155 $V^{2+}$ ion
156 complexing agent
158 complexing molecule
160 cysteine
162 cation complex
164 first central particle
166 first ligand
168 mediator complex
170 second central particle
172 second ligand
174 hydroxide ion
176 transport layer

What is claimed is:

1. An electrolyzer for splitting molecular water into molecular hydrogen and molecular oxygen using electrical energy, which electrolyzer comprises an anodic half-cell with an anode and a cathodic half-cell with a cathode, wherein the anodic half-cell and the cathodic half-cell are separated from each other by a separator, wherein the anodic half-cell comprises an anodic electrolyte, which is in contact with the anode, and wherein the cathodic half-cell comprises a cathodic electrolyte, which is in contact with the cathode, wherein the anodic half-cell comprises an anodic catalyst, wherein the cathodic half-cell comprises at least one cation complex for forming at least one mediator complex, wherein the at least one cation complex is reducible to the mediator complex by taking up at least one electron at the cathode, and wherein the mediator complex is a catalytically active chemical complex for splitting the molecular water ($H_2O$) into molecular hydrogen ($H_2$) and hydroxide ions ($OH^-$) while releasing at least one electron, wherein the separator is configured in the form of an anion exchange membrane.

2. The electrolyzer in accordance with claim 1, wherein the at least one cation complex is a catalytically inactive or substantially inactive chemical complex.

3. The electrolyzer in accordance with claim 1, wherein the cation complex and the mediator complex are dissolved in the cathodic electrolyte.

4. The electrolyzer in accordance with claim 1, wherein the at least one cation complex is formed by at least one first central particle and at least one first ligand, which surrounds the at least one first central particle, wherein the mediator complex is formed by at least one second central particle and at least one second ligand, which surrounds the at least one second central particle, wherein the at least one first central particle and the at least one second central particle form a redox pair in such a way, wherein the first central particle is reducible to the second central particle by taking up at least one electron, and wherein the at least one second central particle is oxidizable to the first central particle by releasing at least one electron.

5. The electrolyzer in accordance with claim 4, further comprising at least one of the following features:
a) The at least one first central particle is a cation reducible by at least one oxidation state and the at least one second central particle is the cation reduced by the at least one oxidation state,
and
b) the cation complex is formed by one single first central particle and/or the mediator complex is formed by one single second central particle.

6. The electrolyzer in accordance with claim 4, further comprising at least one of the following features:
a) The at least one first ligand and the at least one second ligand are identical
and
b) the at least one first ligand and/or the at least one second ligand are configured in the form of a complexing agent,
and
c) the at least one first ligand and/or the at least one second ligand is or contains mercaptoacetic acid, 2-mercaptopropionic acid, cysteamine, cysteine, cysteinmethylester, or catechol
and
d) the at least one first central particle is introduced into the cathodic electrolyte by dissolving a salt, which contains the at least one first central particle
and
e) the at least one first ligand and/or the at least one second ligand is introduced into the cathodic electrolyte by dissolving.

7. The electrolyzer in accordance with claim 1, further comprising at least one of the following features:
a) The anion exchange membrane is configured to be permeable to hydroxide ions,
and
b) the cathodic electrolyte is water or an aqueous solution and/or the anodic electrolyte is water or an aqueous solution
and
c) the anodic electrolyte has a pH value of at least about 7 and
d) the cathodic electrolyte has a pH value in a range from 0 to about 9
and e) a pH value of the anodic electrolyte and a pH value of the cathodic electrolyte are different and define a pH gradient.

8. The electrolyzer in accordance with claim 1, further comprising at least one of the following features:
   a) The cathodic half-cell contains a pH value regulator, and
   b) the anode consists of the anodic catalyst or is made of the anodic catalyst or contains the anodic catalyst or is coated with the anodic catalyst or is electrically conductively in contact with the anodic catalyst or the separator is coated with the anodic catalyst or is electrically conductively in contact with the anodic catalyst.

9. The electrolyzer in accordance with claim 1, further comprising at least one of the following features:
   a) The anode is of solid or reticular configuration and
   b) the anodic catalyst is nickel, iridium, or cobalt, or contains nickel, iridium, and/or cobalt, and
   c) the cathode is made of carbon or stainless steel.

10. A method for splitting molecular water into molecular hydrogen and molecular oxygen using electrical energy, in which method hydroxide ions are oxidized in an anodic half-cell with an anode with the involvement of an anodic catalyst, wherein the anodic half-cell is separated from a cathodic half-cell with a cathode by a separator, wherein the anodic half-cell comprises an anodic electrolyte, which is in contact with the anode, and wherein the cathodic half-cell comprises a cathodic electrolyte, which is in contact with the cathode, wherein the molecular water ($H_2O$) in the cathodic half-cell is split into molecular hydrogen ($H_2$) and hydroxide ions (OH—) with the involvement of at least one mediator complex, wherein in the cathodic half-cell the at least one mediator complex is formed from at least one cation complex, wherein the mediator complex is a catalytically active chemical complex for splitting the molecular water ($H_2O$) into molecular hydrogen ($H_2$) and hydroxide ions (OH—) while releasing at least one electron, and wherein the at least one cation complex is reduced to the mediator complex by taking up at least one electron at the cathode, wherein the separator is configured in the form of an anion exchange membrane.

11. The method in accordance with claim 10, wherein a catalytically inactive or substantially inactive chemical complex is used as the at least one cation complex.

12. The method in accordance with claim 10, wherein the cation complex and the mediator complex are dissolved in the cathodic electrolyte.

13. The method in accordance with claim 10, wherein the at least one cation complex is formed by at least one first central particle and at least one first ligand, which surrounds the at least one first central particle, wherein the mediator complex is formed by at least one second central particle and at least one second ligand, which surrounds the at least one second central particle, wherein the at least one first central particle and the at least one second central particle form a redox pair in such a way, wherein the first central particle is reducible to the second central particle by taking up at least one electron, and wherein the at least one second central particle is oxidizable to the first central particle by releasing at least one electron.

14. The method in accordance with claim 13, further comprising at least one of the following features:
   a) A cation reducible by at least one oxidation slate is used as the at least one first central particle, and the at least one second central particle is the cation reduced by the at least one oxidation state, and
   b) the cation complex is formed by one single first central particle and/or the mediator complex is formed by one single second central particle.

15. The method in accordance with claim 13, further comprising at least one of the following features:
   a) the at least one first ligand and the at least one second ligand are used identically and
   b) the at least one first ligand and/or the at least one second ligand are configured in the form of a complexing agent, and
   c) mercaptoacetic acid, 2-mercaptopropionic acid, cysteamine, cysteine, cysteinmethylester, or catechol is used as the at least one first ligand and/or the at least one second ligand, and
   d) the at least one first central particle is introduced into the cathodic electrolyte by dissolving a salt, which contains the at least one first central molecule, and
   e) the at least one first ligand and/or the at least one second ligand is introduced into the cathodic electrolyte by dissolving.

16. The method in accordance with claim 10, further comprising at least one of the following features:
   a) The anion exchange membrane is configured to be permeable to hydroxide ions, and
   b) water or an aqueous solution is used as the cathodic electrolyte and/or water or an aqueous solution is used as the anodic electrolyte and
   c) the anodic electrolyte is used having a pH value of at least about 7, and
   d) the cathodic electrolyte is used having a pH value in a range from 0 to about 9 and
   e) an anodic electrolyte and a cathodic electrolyte are used having differing pH values and define a pH gradient.

17. The method in accordance with claim 10, wherein a pH value regulator is added to the cathodic half-cell.

18. The method in accordance with claim 10, further comprising at least one of the following features:
   a) the anode is configured in such a way that it consists of the anodic catalyst or is made of the anodic catalyst or contains the anodic catalyst or is coated with the anodic catalyst or is electrically conductively in contact with the anodic catalyst and
   b) the separator is coated with the anodic catalyst or is electrically conductively brought into contact with the anodic catalyst.

19. The method in accordance with claim 10, further comprising at least one of the following features:
   a) The anode is configured to be solid or reticular and
   b) an anodic catalyst is used, which is nickel, iridium, or cobalt, or contains nickel, iridium, and/or cobalt, and
   c) the cathode is made of carbon or stainless steel.

20. Use of an electrolyzer in accordance with claim 1 for performing a method in accordance with claim 10.

* * * * *

UNITED STATES PATENT AND TRADEMARK OFFICE
CERTIFICATE OF CORRECTION

| | |
|---|---|
| PATENT NO. | : 11,313,044 B2 |
| APPLICATION NO. | : 16/947737 |
| DATED | : April 26, 2022 |
| INVENTOR(S) | : Hosseiny et al. |

It is certified that error appears in the above-identified patent and that said Letters Patent is hereby corrected as shown below:

On the Title Page

"(73) Assignee: Deutsches Zentrum fuer Loft- und Raumfart e.V., Cologne (DE)" should read
-- (73) Assignee: Deutsches Zentrum fuer Luft- und Raumfart e.V., Cologne (DE) --

In the Claims

Column 15, Line 67: "into molecular hydrogen ($H_2$) and hydroxide ions (OH—)" should read
-- into molecular hydrogen ($H_2$) and hydroxide ions ($OH^-$) --

Column 17, Line 34: "ions (OH—) with the involvement of a least one mediator" should read -- ions ($OH^-$) with the involvement of a least one mediator --

Column 17, Line 39: "into molecular hydrogen ($H_2$) and hydroxide ions (OH—)" should read -- into molecular hydrogen ($H_2$) and hydroxide ions ($OH^-$) --

Signed and Sealed this
Seventh Day of June, 2022

Katherine Kelly Vidal
*Director of the United States Patent and Trademark Office*